United States Patent
Kistersky et al.

[11] Patent Number: 6,137,094
[45] Date of Patent: Oct. 24, 2000

[54] EXTERNAL INDUCTOR FOR MAGNETIC-PULSE WELDING AND FORMING

[76] Inventors: Ludmila Kistersky, 456 Eaton St., Providence, R.I. 02908; Daniil Dudko, 22-26 Anri Barbusa Street, Apartment 113, Kiev, Ukraine, 252005; Shevchenko Viacheslav, 460 Eaton St., Providence, R.I. 02908

[21] Appl. No.: 09/383,822

[22] Filed: Aug. 27, 1999

Related U.S. Application Data

[60] Provisional application No. 60/102,375, Sep. 29, 1998.

[51] Int. Cl.[7] .................................................. H05B 6/36
[52] U.S. Cl. ........................ 219/672; 219/603; 219/617; 336/84 C
[58] Field of Search ...................................... 219/603, 611, 219/617, 656, 662, 670, 523, 536, 542; 228/2.5, 119, 107; 336/84 C, 180, 192, 223

[56] References Cited

U.S. PATENT DOCUMENTS

| | | |
|---|---|---|
| 2,066,668 | 1/1937 | Bennett ...................................... 219/50 |
| 2,976,907 | 3/1961 | Harvey et al. . |
| 3,747,206 | 7/1973 | Pease ........................................ 29/611 |
| 4,129,842 | 12/1978 | Torii et al. ................................ 334/15 |
| 4,607,778 | 8/1986 | Oakley et al. ............................ 228/2.5 |
| 4,990,732 | 2/1991 | Dudko et al. ............................. 219/617 |
| 5,443,201 | 8/1995 | Cartry ....................................... 228/119 |
| 5,824,998 | 10/1998 | Livshiz et al. ............................ 219/617 |
| 5,966,813 | 10/1999 | Durand .................................... 29/897.2 |
| 5,981,921 | 11/1999 | Yablochnikov ........................... 219/603 |

Primary Examiner—Teresa Walberg
Assistant Examiner—Jeffrey Pwu
Attorney, Agent, or Firm—Barlow, Josephs & Holmes, Ltd.

[57] ABSTRACT

An external inductor for magnetic pulse welding and forming includes an outer steel frame and an inner beryllium-bronze alloy insert which is removably mounted within the frame. The steel frame and the beryllium bronze insert respectively split the responsibility for higher mechanical strength and more concentrated pulse current on the inner surface of inductor's central opening. The improved external inductor design is capable of creating greater impulse forces onto the outer workpiece and has been demonstrated to perform at least 25–30% more deformation than a simple one piece simple steel external inductor for a full metallurgical joint.

17 Claims, 8 Drawing Sheets

EXTERNAL INDUCTOR FOR MAGNETIC-PULSE WELDING AND FORMING

This application claims benefit of provisional application Ser. No. 60/102,375, filed Sep. 29, 1998.

BACKGROUND AND SUMMARY OF THE INVENTION

The present invention relates generally to metal welding and forming devices and more particularly to a device in which tubular metal components are metallurgically joined (or mechanically formed) by energy acquired from a pulse magnetic field, otherwise known as magnetic-pulse welding.

Magnetic-pulse welding creates a full metallurgical joining of tubular metal components in a cold stage by applying a short impulse of mechanical force to the surfaces of coaxially pre-assembled tubular metal components to be welded. A predetermined magnetic impulse force created by an inductor assembly, forces the outer component against the inner component, thus forcing the molecules of the outer metal or metal alloy component to penetrate into the inner metal or metal alloy component, and create a full metallurgical joint in cold stage. Many different metals and metal alloys can be employed in the process, such as aluminum and copper, aluminum and steel, and aluminum alloys of different grades and tempers.

Methods of metal forming and treating using magnetic-pulse fields are well-known in the art. For example, the U.S. Pat. No. 2,976,907 to G. W. Harvey disclose three different designs of simple external inductors capable of forming or welding tubular workpieces. Generally, the simplest external inductor is a bar of conductive material, i.e. steel, copper, etc. formed in a loop which is connected to an energy source. The looped inductor is responsible for conducting an impulse current created by a special switching means (thyratron, spark gap, or other discharge means). The inductor concentrates a magnetic field inside of the loop's central opening in the period of duration of the initial impulse current. This field creates an inductive pulse current in the outer tubular workpiece which is repelled inwardly from the loop (external inductor) due to the electromagnetic interaction of the initial and inductive pulse currents and collapses against an inner component with predetermined force and velocity. As soon as these forces and velocity overcome a defined critical range, the molecules of the outer component metal penetrate into the metal of inner component producing a full metallurgical joint in cold stage.

While the prior art external inductors are adequate for the joining of relatively thin workpieces, there is a noted lack of external inductors which are capable of exerting sufficient magnetic fields for the joining of large diameter workpieces and workpieces of greater thicknesses. It is thus an object of the present invention to provide an improved external inductor device for magnetic-pulse welding which is capable of creating a more powerful and concentrated impulse of the magnetic field and a respective impulse of inductive current in the outer workpiece to develop more mechanical force and to perform at least 25–30% more deformation than a simple one piece external inductor. More specifically, the improved external inductor will consist of two separate components, namely an outer frame and an inner disk-insert, each fabricated from different metals, which split the responsibility for higher mechanical strength and more concentrated pulse current on the inner surface of inductor's central opening. The outer frame is preferably fabricated from steel to provide overall strength to the assembly, while the inner disk insert is preferably fabricated from a beryllium-bronze alloy which provides superior electrical conductivity around the inner perimeter of the inductor. A further object of the present invention is to improve the quality of the weld, or forming, in the area near the slot between the input and output contacts of the inductor. It has been found that inconsistent, i.e. non-uniform, welding or forming occurs in this slot area because the electrical current tends to seek the path of least resistance around the perimeter of the inductor structure, and the path of least resistance does not closely follow the slot. In other words, the pulse current will tend to follow an inverted U-shaped path rather than a more circular, i.e. Omega-shaped, path ($\Omega$) around the inductor. Accordingly, the present invention seeks to concentrate the pulse current in the nearest proximity of the slot using symmetric oval openings within the body of the inductor loop. The openings are located in the path of least resistance and force the current to take a path which is closer to the slot, thus forcing the impulse current towards the inner surfaces of the inductor loop.

Still another object of the present invention is to extend the lifetime of such an external inductor assembly by providing a removable inner disk-insert which can be easily removed and replaced as needed.

Additional objects and advantages of the present invention will become apparent from the following description and claims.

BRIEF DESCRIPTION OF THE DRAWING FIGURES

In the drawings which illustrate the best mode presently contemplated for carrying out the present invention:

DETAILED DESCRIPTION OF THE PREFERRED EMBODIMENT

Figure 1:
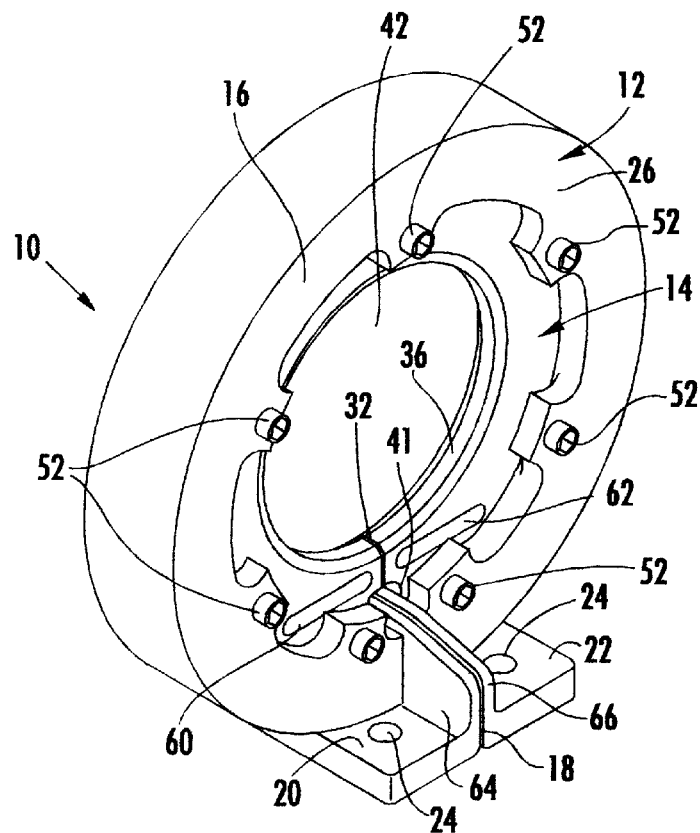
FIG. 1 is a perspective front view of the external inductor assembly of the present invention.
Figure 2:
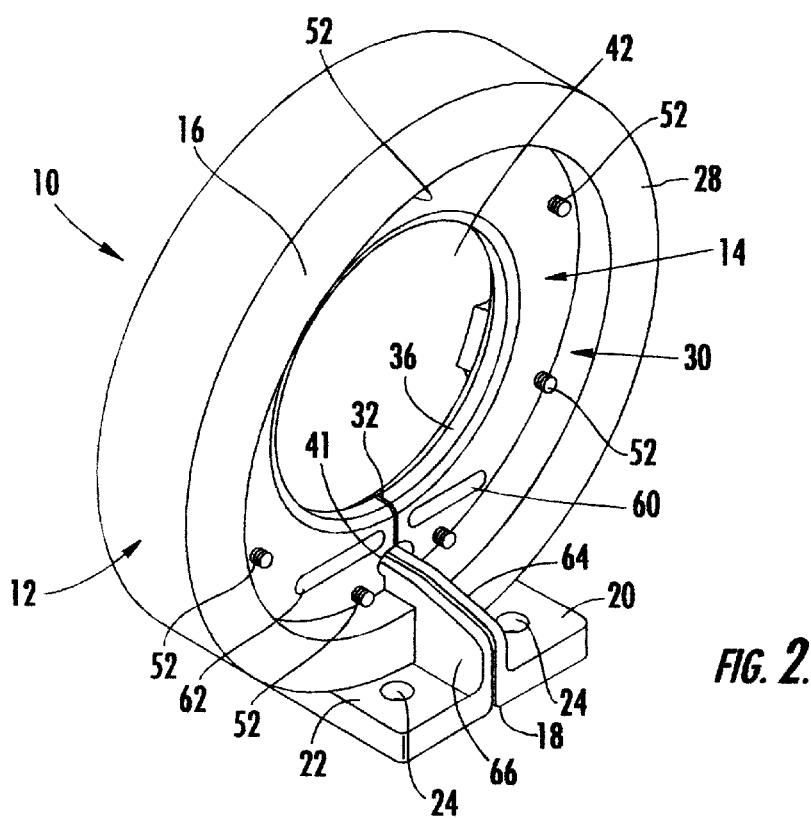
FIG. 2 is a perspective rear view thereof.
Figure 3:
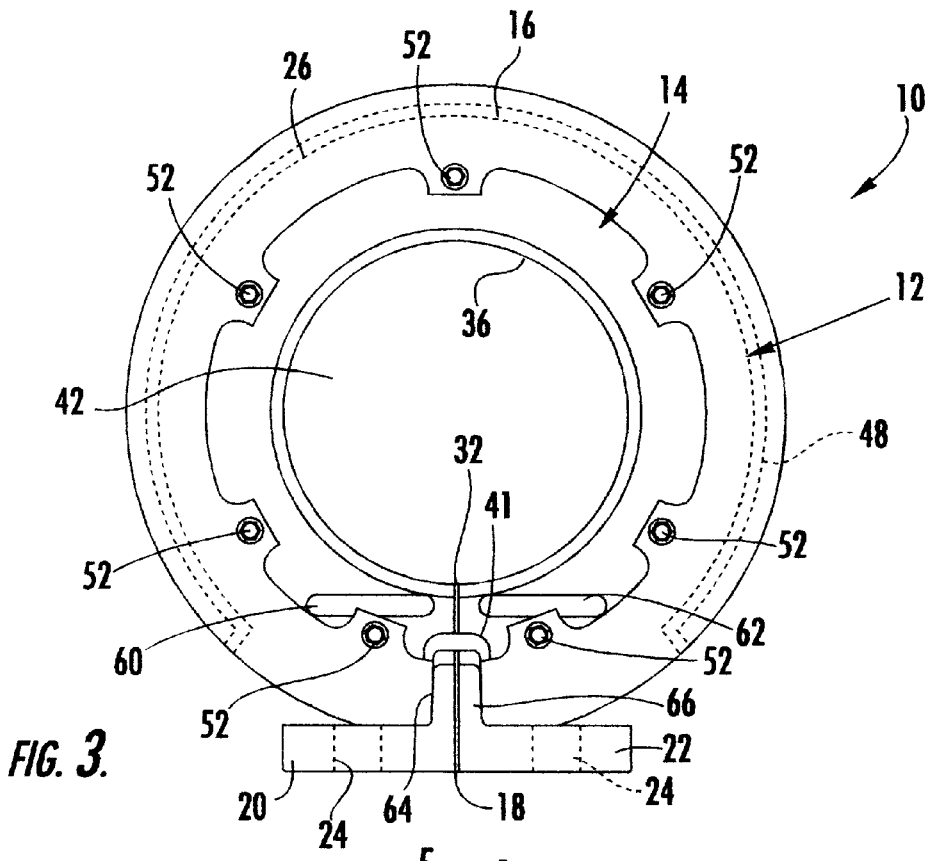
FIG. 3 is a front view thereof.
Figure 4:
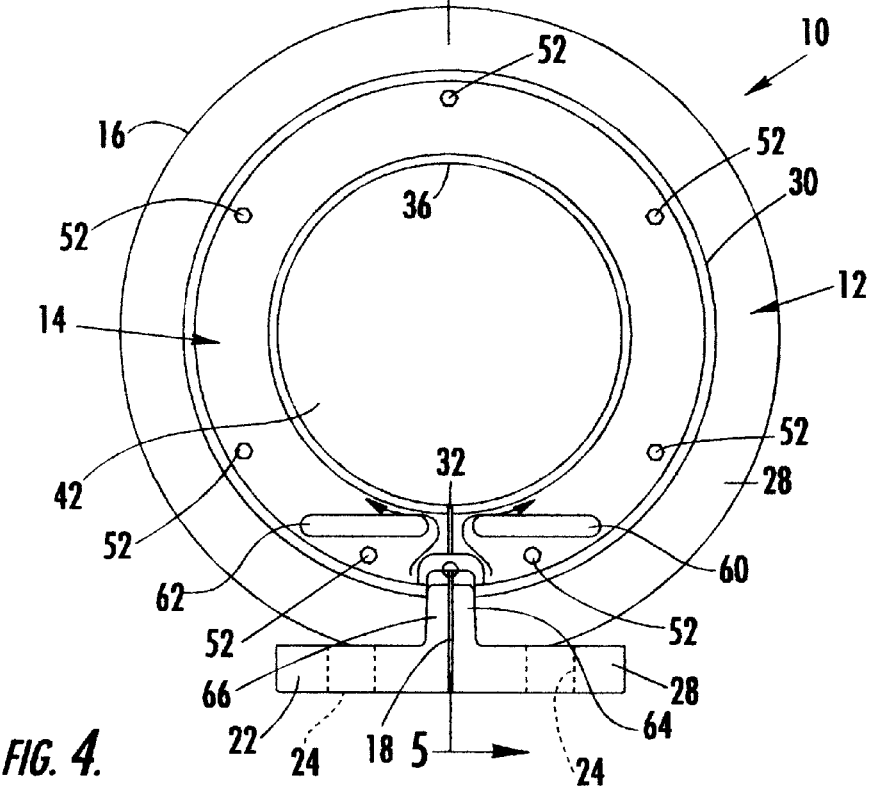
FIG. 4 is a rear view thereof.
Figure 5:
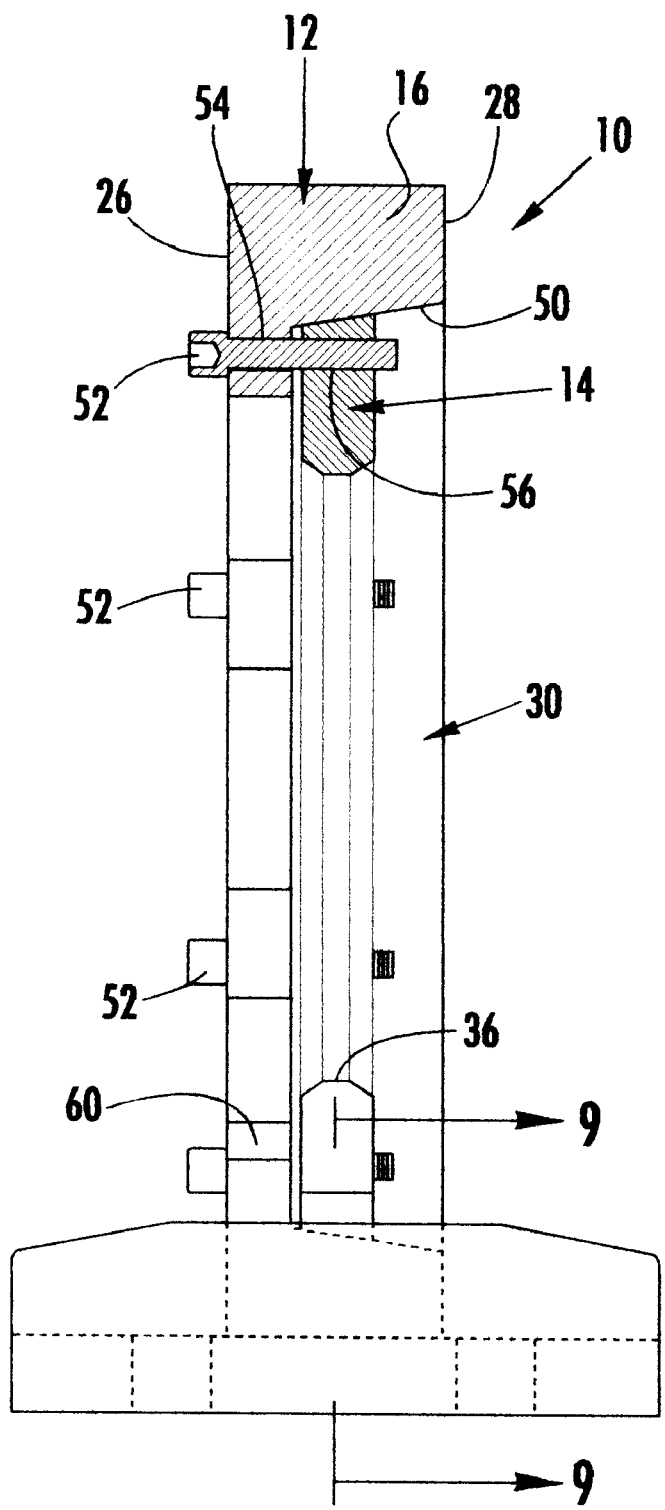
FIG. 5 is a cross-sectional view thereof as taken along line 5—5 of the FIG. 4.
Figure 6:
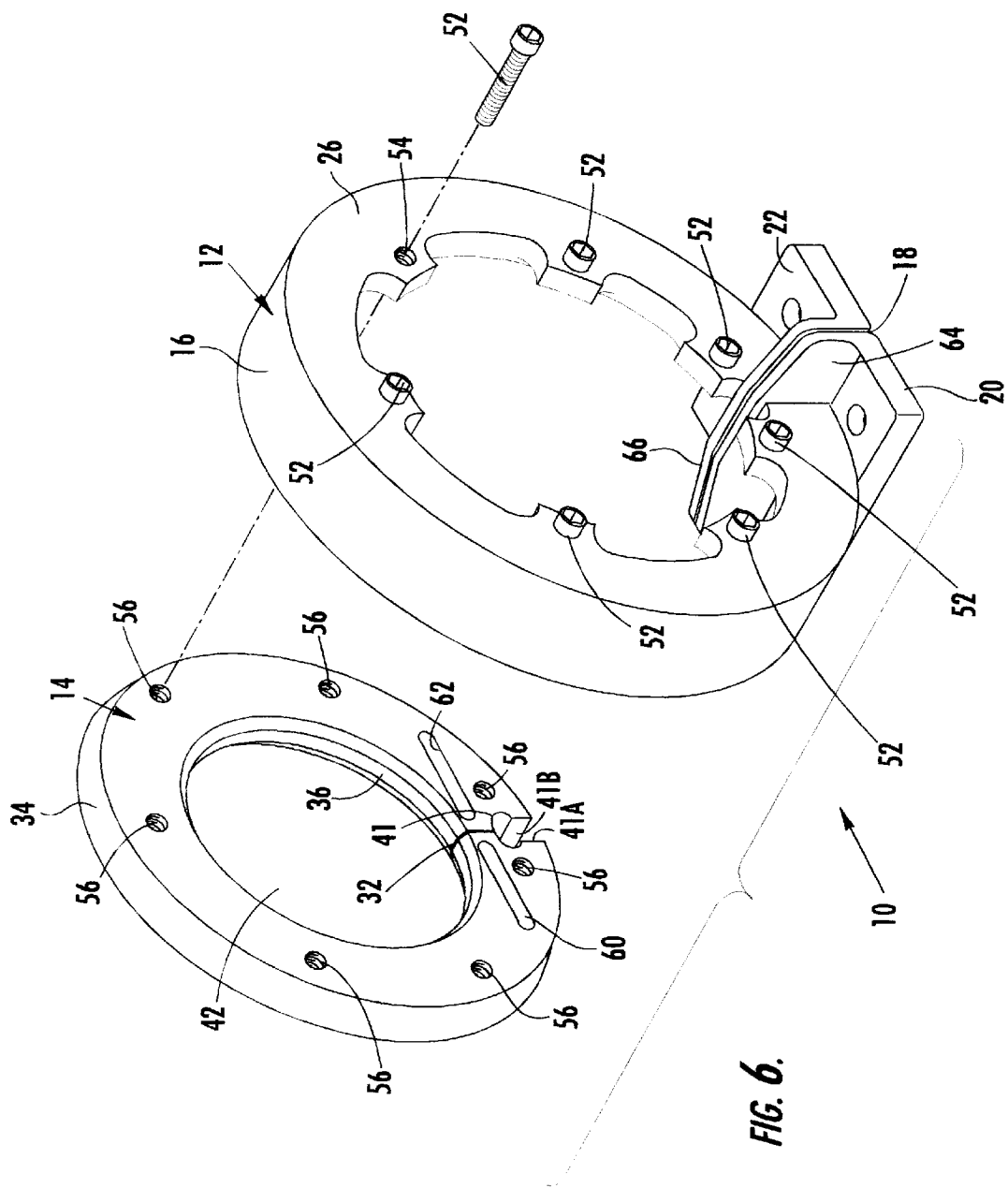
FIG. 6 is an exploded perspective view thereof showing assembly of the outer frame and inner disk-insert.

Referring now to the drawings, the external inductor assembly is illustrated and generally indicated at 10 in FIGS. 1–8. As will hereinafter be more fully described, the external inductor 10 comprises an outer frame portion generally indicated at 12 and an inner disk-insert generally indicated at 14 which is removably assembled with the outer frame 12.

A magnetic-pulse welding device generally comprises a high-power current source (for example industrial MPW unit H-126 A—not shown) for generating an initial impulse current and an inductor assembly, such as an external inductor, for creating a concentrated magnetic field having a predetermined impulse shape. When the contacts of an external inductor are connected to the source of an initial impulse current having a predetermined duration and amplitude, this current produces a respective magnetic field which strength and concentration will depend on conductivity of the inductor's metal as well as on a frequency of the variation of the initial current. By shaping the external inductor in the form of a disk and using a very conductive material (having at the same time enough mechanical strength to withstand against deformation, for example beryllium or chromium bronze) an initial high frequency pulse current is concentrated in an extremely thin skin layer (about 0.5 mm for the above mentioned configuration) on the inner surface of disk opening. In this regard, a toroidal magnetic field of high strength and concentration is produced inside of the opening. Coaxially pre-assembled tubular workpieces placed inside of the inductor's opening will be collapsed by the resulting radial forces of the electromagnetic interaction of the initial pulse current (from energy storage means) in the external inductor and the respective inductive pulse current in the outer component to be welded. High instant pressure on outer component as well as the same pressure on external inductor leads to substantial deformation of these members. If the metal of outer tubular component is ductile and special conditions are maintained for the pre-welded design, i.e. a defined gap between the components to be welded and critical angle in the contact point between the collapsing outer and withstanding inner component will be created at the beginning of the deformation, the penetration of the molecules of the outer component metal in the inner component will occur in cold stage and a full metallurgical joint will be created. If the above critical conditions are not maintained, the deformation of the outer component still will take place and the external inductor could be used for other metal forming applications.

Referring to FIG. 1, the external inductor 10 may be utilized in magnetic-pulse welding of tubular components, or for metal forming applications. The outer frame 12 is preferably constructed from a steel compound, such as a mild steel, and generally takes the shape of the Greek symbol omega ($\Omega$). The inner disk-insert 14 is preferably generally cylindrical in shape and constructed from a metal alloy having the combined characteristics of high strength and high conductivity. With regard to mechanical strength, such an alloy should have a tensile strength of between about 65,000 and 75,000 PSI and a yield point of about 45,000 to about 50,000 PSI. With regard to conductivity, the alloy should have a conductivity of not less than 12–13% of the conductivity of pure copper. Examples of suitable alloys include, but are not limited to, a beryllium or chromium alloy, such as beryllium bronze or chromium bronze.

More specifically, the outer frame 12 includes a cylindrical body portion 16 having a radially extending narrow slot 18 formed therein, and symmetrically opposed contact plates 20, 22 extending outwardly from opposing sides of the slot 18. The contact plates 20, 22 each include bolt openings 24 for attaching the frame 12 to a contact plate of a high energy storage device (not shown). The contact plates 20, 22 still further include square-shaped screen shoulders 64, 66 which border the slot 18. These shoulders 64, 66 play a key role in reducing electroerosion and will be further described at a later point in the specification. The body portion 16 has a front surface 26 and a rear surface 28, and further includes a mounting recess 30 formed in the rear surface 28.

The insert 14 also has a radially extending narrow slot 32 formed therein. The insert 14 further has an outer peripheral contact edge 34 which is mounted in the recess 30 in the outer frame, and an inner peripheral edge 36 which forms an opening for receiving coaxially pre-assembled workpieces 38, 40 to be welded (See FIGS. 7 and 8). The inner insert 14 is received in assembled relation with the outer frame 12 such that the respective narrow slots 18, 32 are in mating radial alignment. The disk-insert 14 further includes a symmetrical Omega-shaped opening 41 in the outer peripheral edge formed around the slot 32. The opening 42 is received over the shoulders 64, 66 wherein the opposing walls 41A, 41B (FIG. 6) of the opening 41 engage with the shoulder 64, 66 to form electrical contact areas 67, 68 (FIG. 9) between the frame 12 and the disk-insert 14.

Figure 10:
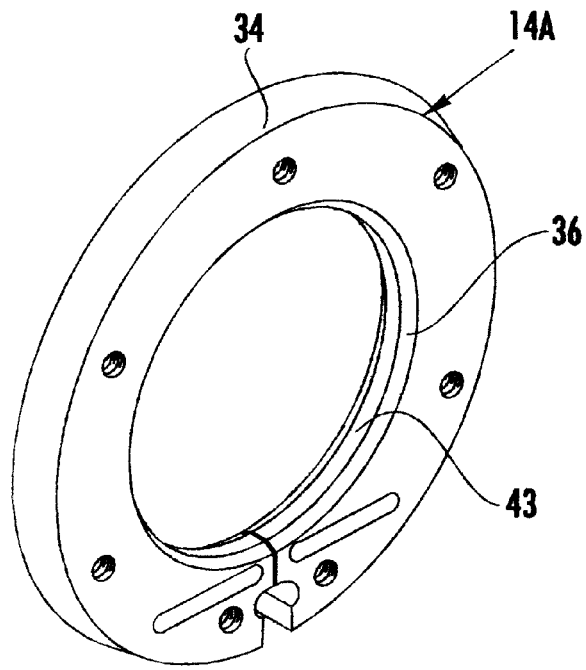
FIG. 10 is a perspective view of an alternate embodiment of the inner disk.
Figure 11:
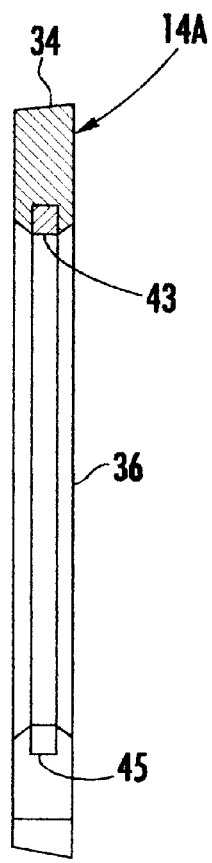
FIG. 11 is a cross-sectional view thereof as taken along line 11—11 of FIG. 10.

Referring to FIGS. 10 and 11, an alternative inner disk-insert 14A is formed from mild steel and includes a copper insert ring 43 which is brazed into a groove 45 along the inner peripheral edge 36 of the disk-insert. The insert ring 43 can alternatively comprise any another highly conductive brazing alloy, including beryllium, bronze etc. or a titanium foam.

Figure 7:
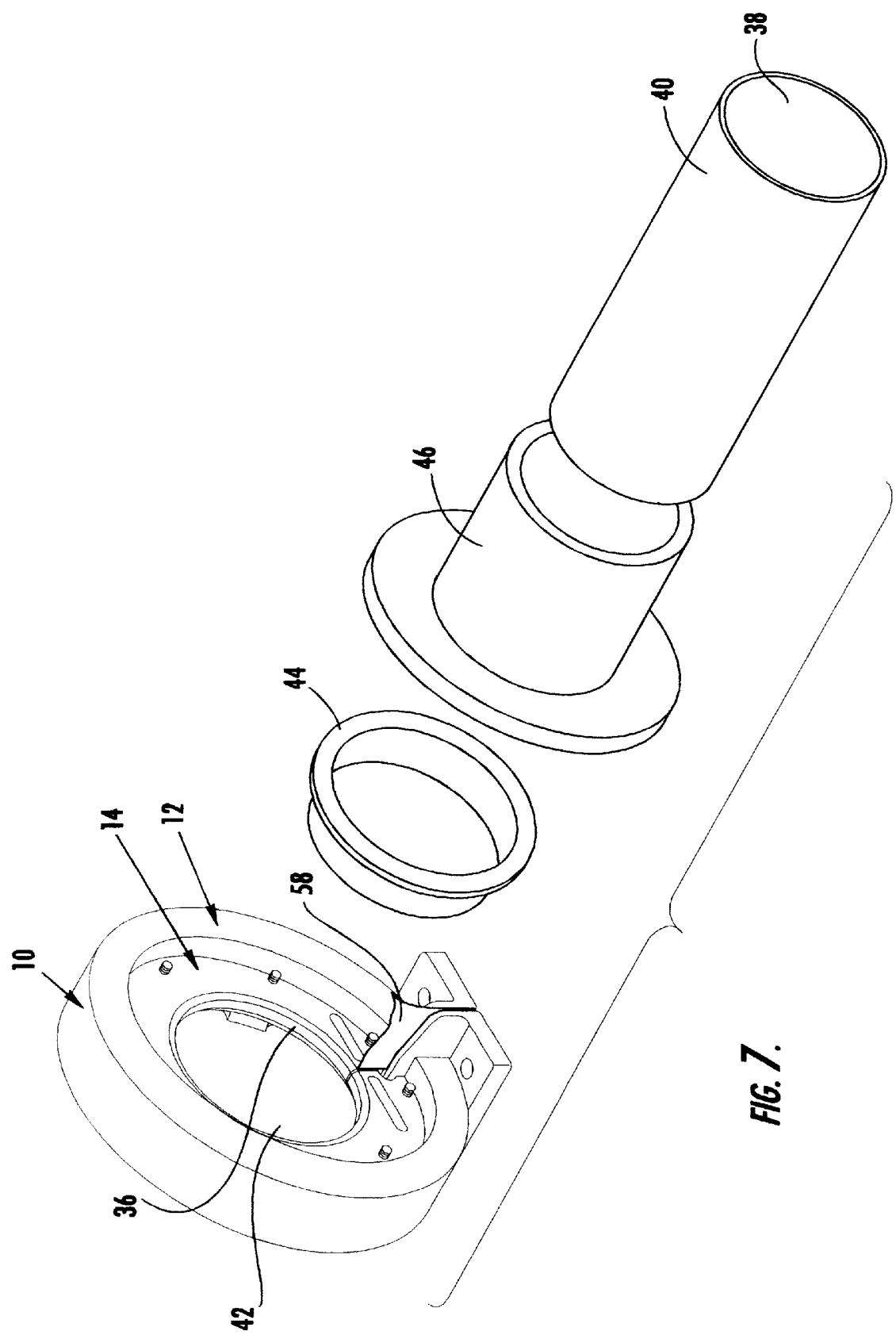
FIG. 7 is another exploded perspective view thereof showing the workpiece holder assembly and the pre-assembled workpieces.
Figure 8:
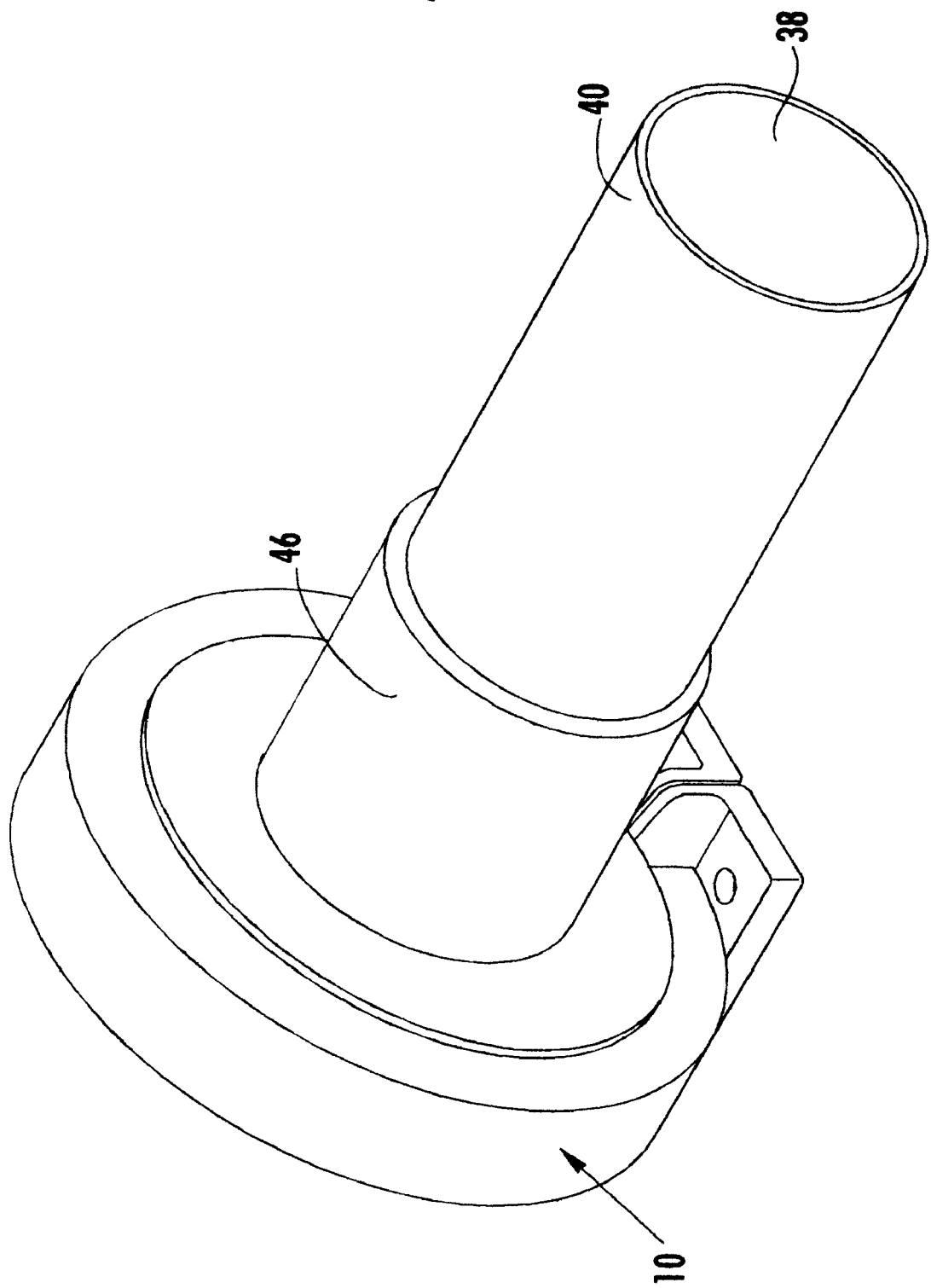
FIG. 8 is yet another perspective view thereof showing the workpieces assembled with the workpiece holders and the external inductor in the arrangement which is used to metallurgically join or form the tubular components.
Figure 9:
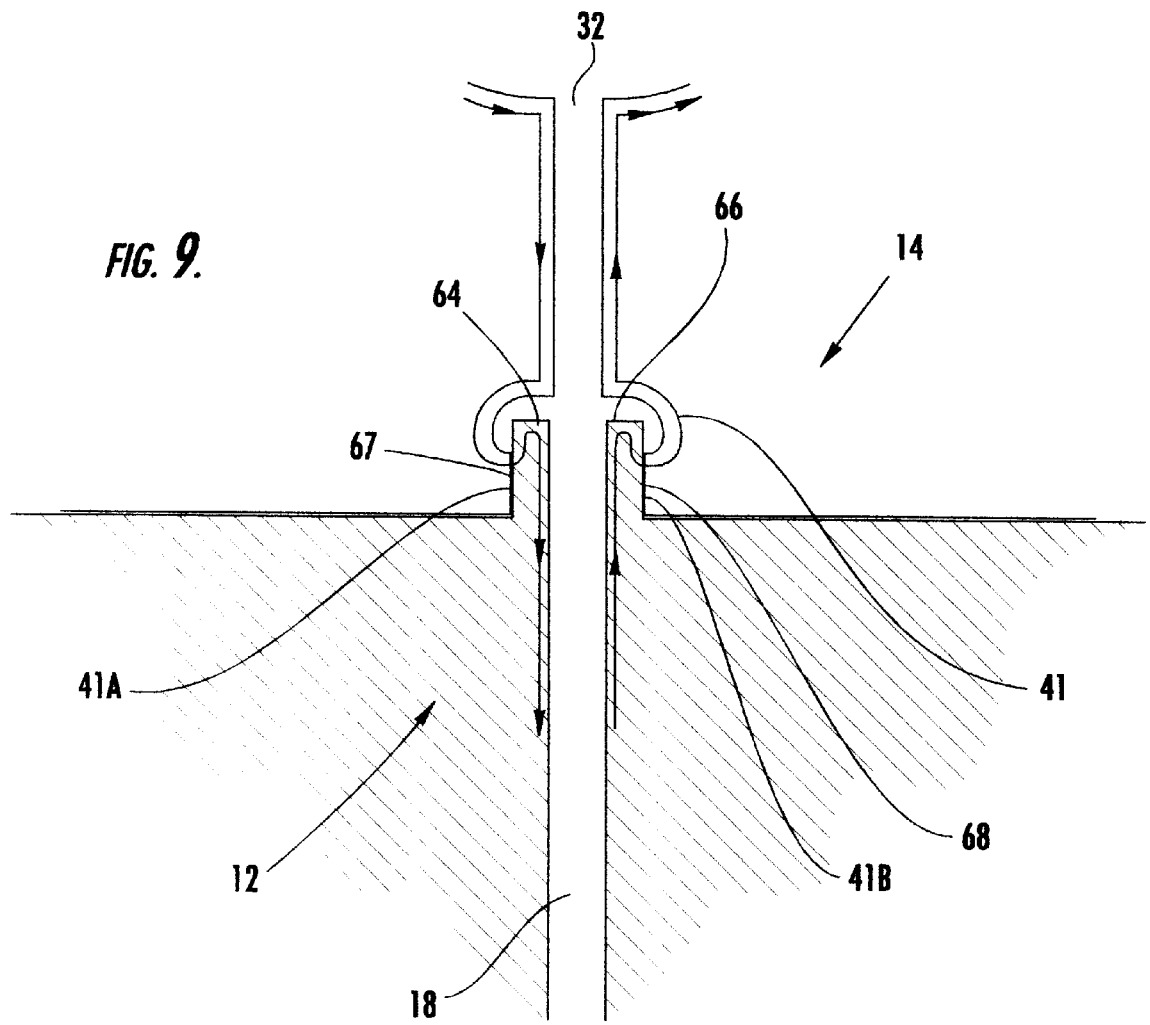
FIG. 9 is a cross-sectional view thereof as taken along line 9—9 of FIG. 5.

In the operation of the external inductor 10, the concentrated impulse magnetic field is set up by passing a short (about 20 $\mu$sec.) current pulse (about 500,000 A) from a suitable energy storage means (not shown) to the inductor 10. This initial current passes through the contact plates 20, 22 into the body portion 16 of the outer frame, and then into the disk-insert 14. Due to the high frequency pulse, the current is mostly concentrated in an extremely thin skin layer (about 0.5 mm for above mentioned configuration) on the inner peripheral edge 36 of disk-insert 14. A toroidal magnetic field of high strength and concentration is produced inside of the central opening 42 which is defined by the inner peripheral edge 36. Referring to FIGS. 7 and 8, coaxially pre-assembled workpieces 38, 40 are held in position within the central opening 42 by workpiece holders 44, 46. The outer element 40 of the coaxially pre-assembled tubular workpieces is collapsed inwardly into the inner component 38 by radial forces due to the electromagnetic interaction of initial pulse current and the respective inductive pulse current in the outer component. The outer steel frame 12 of the external inductor 10 is responsible for keeping the disk-insert in place and for preventing mechanical deformation because of the radial impulse forces. The outer frame 12 can also include the means for heat exchange, such as interior channels 48 (shown in broken lines in FIG. 3) for passing cooling water inside the frame 12. The conical disk-insert 14 is a removable or changeable part having a frusto-conical outer contact surface (outer peripheral edge 34) which mates congruently with a frusto-conical inner contact surface 50 (FIG. 5) of mounting recess 30 of the steel frame 12. The insert 14 is fixed tightly to the frame by fastener bolts 52 which extend through openings 54 in the outer frame 12 an into respective threaded holes 56 in the disk-insert 14. The narrow slot 32 provided in the disk-insert is aligned with the respective slot 18 in the frame 12 for receiving a good multi-layer isolative material 58 (FIG. 7), such as thin Teflon strips, which are able to effectively insulate the input and output contacts from each other for impulse of high voltage (up to 17 kV) from the respective energy storage means.

Turning back to the workpiece holders, the inner surface edge 36 of the disk-insert opening 42 is isolated from outer component to be welded 40 by a thin (about 0.8 mm) holder-ring 44, made from electrically isolative material, such as Teflon, etc. to allow the magnetic field to penetrate into the metal of outer tubular component 40. It is important that the ring 44 is made from a material having good electrical insulating characteristics, as any current that may pass between the insert 14 and the workpiece would short circuit then entire device and cause significant damage. The good conductivity of beryllium (or chromium) bronze combined with its high mechanical strength provides a concentrated pulse current and increases the pressure and the respective mechanical deformation on the outer tubular component 40 to be collapsed.

The insert 14 further includes elongated, oval, openings 60, 62 in close proximity to the narrow slot 32. These openings are responsible for concentrating, or forcing, the impulse current closer to the edges of the slot (see arrows FIG. 4). In this manner, the usual effects of a weak magnetic field in the vicinity of the slot 32 and the resulting decrease of deformation of outer tubular component to be collapsed at this particular place (and the respective non welded area against the slot) is avoided.

The screen shoulders 64, 66, described previously, protect the area of contact between the frame 12 and the disk-insert 14 against the effects of electroerosion which appears near the slot 18, 32. In case of some existing irregularity in this contact area there is a possibility that overheated micro clusters of metal can be formed here. The strong impulse of the magnetic field will move these overheated clusters easily from the surface, which is the main reason for electroerosion in this area.

To avoid magnetic pressure on the contact area, an artificially complicated path for the current is developed. In this regard, the disk-insert 14 is provided with an Omega-shaped (Ω) opening 41 to provide contact areas 67, 68 which contact the respective shoulders 64, 66 in the manner best illustrated in FIG. 9. When the current is high frequency current or impulse current, the current travels using a skin effect in the nearest proximity to the surfaces of the disk-insert 14 following the path (arrows) best illustrated in FIG. 9. The influence of the shoulders 64, 66 and the Omega-shaped opening 41 is shown on the cross section sketch of FIG. 9. The path of the high impulse current concentrated on the surfaces of shoulders 64, 66 is shown by the arrows. As soon as the current is forced along an artificially complicated path and interacts near the contact surfaces like two currents going in perpendicular directions (See FIG. 9) the magnetic field near the contact areas 67, 68 is minimized and the effect of electroerosion is substantially reduced or eliminated. According to experiments, this complicated electrical path decreases the electroerosion on the contact areas 67, 68 at least 100 times in comparison with non-protected contact areas. In general, the reduction in electroerosion can be explained by the presence of multiple perpendicular turns in the current path near the contact areas. The perpendicular magnetic fields generated by the different perpendicular parts of the current paths in these areas interact with each other and effectively cancel each other out. Locating the contact areas 67, 68 in an area where there is at least one 90 degree turn in the electric current decreases magnetic pressure substantially due to interaction of the resulting perpendicular magnetic fields.

The described construction of the shoulders 64, 66 and opening 41 can be successfully used for protecting other high impulse and high frequency devices against electroerosion, for example, for resistant welding machines contacts (flesh-butt welding, spot welding), for feeder connectors with antennas (radio location) and other high frequency fields of applications where skin-effects are acting.

EXAMPLE

In a practical embodiment of external inductor 10, a disk-insert 14 having a work zone width of about 5 mm and an inner opening for a 4" OD workpiece was utilized to create a magnetic field impulse using an initial impulse of current from an industrial magnetic-pulse welding unit (H-126, about 20 kj battery of capacitors, maximum working voltage −17.1 kV, working cycle 20 $\mu$sec). The results of welding with the improved external inductor 10 were compared to a simple steel inductor (prior art) for welding an Al tube (OD 4" grade 6061 temper T-6 welded) to a mild steel tube. Both tests used the same energy settings and the same pre-weld design. A complete welding all around the tubes was obtained for Al tube having a maximum wall thickness of 0.8 mm using a simple steel external inductor. However, using the new external inductor 10, a complete weld was achieved for 1.25 mm wall thickness (62% more thickness). A comparison of deformations of the plain Al tube (per radius) obtained by using both the old and the newly designed inductors shows about 30% more deformation for the new design of the external inductor 10.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An external inductor assembly for magnetic-pulse welding of metal components comprising:

a generally omega-shaped, outer frame constructed from a metal compound, said outer frame including a cylindrical body portion having a radially extending narrow slot formed therein, and symmetrically opposed contact plates extending outwardly from opposing sides of said slot, said contact plates including symmetric shoulders on facing sides of the narrow slot, said cylindrical body portion having a front surface and a rear surface, and a mounting recess formed in said rear surface;

a cylindrical, inner disk-insert constructed from a metal compound, said disk insert having an outer peripheral edge which is mounted in said recess in said outer frame, said inner disk insert having a radially extending slot formed therein, said inner disk-insert further including an inner peripheral edge which defines an opening for receiving coaxially pre-assembled workpieces to be welded, said inner disk-insert being received in assembled relation with the outer frame such that the respective narrow slots are in mating radial alignment;

a fastener for removably mounting said disk-insert within said frame;

a workpiece holder ring received in assembled relation with said disk-insert for holding said coaxially pre-assembled components to be welded in a predetermined position relative to the inner peripheral edge of the inner disk-insert; and an electrically insulative strip inserted within the narrow slots of said frame and said disk-insert.

2. The external inductor assembly of claim 1 wherein said inner disk-insert further includes elongate openings symmetrically aligned on opposing sides of said narrow slot, said opening being arranged in closely spaced proximity to said narrow slot to direct and concentrate pule current near said slot.

3. The external inductor assembly of claim 1 wherein said disk-insert includes a symmetrical opening in the outer peripheral edge around said slot, said opening being received over said shoulder wherein opposing walls of said opening engage said shoulders to form contact areas between said disk-insert and said frame.

4. The external inductor assembly of claim 3 wherein said opening is generally omega-shaped.

5. An external inductor assembly for magnetic-pulse welding and forming of metal components comprising:

a generally omega-shaped, outer frame constructed from a metal compound, said outer frame including a cylindrical body portion having a radially extending narrow slot formed therein, and symmetrically opposed contact plates extending outwardly from opposing sides of said slot, said cylindrical body portion having a front surface and a rear surface, and a mounting recess formed in said rear surface;

a cylindrical, inner disk-insert constructed from a metal compound, said inner disk insert having a radially extending narrow slot formed therein, said disk insert having an outer peripheral edge which is mounted in the recess in said outer frame, said inner disk-insert further including an inner peripheral edge which defines an opening for receiving coaxially pre-assembled workpieces to be welded, said inner disk-insert being received in assembled relation with the outer frame such that the respective narrow slots are in mating radial alignment; and a fastener for removably mounting said disk-insert within said frame.

6. The external inductor assembly of claim 5 wherein said outer frame is fabricated from a steel compound.

7. The external inductor assembly of claim 5 wherein said inner disk-insert is fabricated from a metal alloy having a high mechanical strength and a high conductivity.

8. The external inductor assembly of claim 5 wherein said outer frame includes a fluid channel for circulating a heat exchange fluid.

9. The external inductor assembly of claim 5 further comprising an electrically insulative strip inserted within the narrow slots of said frame and said disk-insert.

10. The external inductor assembly of claim 5 further comprising a workpiece holder receivable in assembled relation with said frame for holding said coaxially pre-assembled components to be welded in a predetermined position relative to the inner peripheral edge of the inner disk-insert.

11. The external inductor assembly of claim 5 wherein said contact plates include symmetric shoulders on facing sides of the narrow slot for protecting contact surfaces between said outer frame and said inner disk-insert against electroerrosion.

12. The external inductor assembly of claim 5 wherein said inner disk-insert further includes elongate openings symmetrically aligned on opposing sides of said narrow slot, said opening being arranged in closely spaced proximity to said narrow slot to direct and concentrate pulse current near said slot.

13. The external inductor assembly of claim 8 wherein said contact plates include symmetric shoulders on facing sides of the narrow slot for protecting contact surfaces between said outer frame and said inner disk-insert against electroerrosion.

14. The external inductor assembly of claim 8 wherein said inner disk-insert further includes elongate openings symmetrically aligned on opposing sides of said narrow slot, said opening being arranged in closely spaced proximity to said narrow slot to direct and concentrate pulse current near said slot.

15. The external inductor assembly of claim 11 wherein said inner disk-insert further includes elongate openings symmetrically aligned on opposing sides of said narrow slot, said opening being arranged in closely spaced proximity to said narrow slot to direct and concentrate pulse current near said slot.

16. The external inductor assembly of claim 5 wherein said disk-insert includes a symmetrical opening in the outer peripheral edge around said slot, said opening being received over said shoulder wherein opposing walls of said opening engage said shoulders to form contact areas between said disk-insert and said frame.

17. The external inductor assembly of claim 16 wherein said opening is generally omega-shaped.

* * * * *